United States Patent
Hosemann

[11] Patent Number: 6,160,795
[45] Date of Patent: Dec. 12, 2000

[54] NETWORK COMMUNICATION

[75] Inventor: Axel Hosemann, Rosstal, Germany

[73] Assignee: Siemens Aktiengesellschaft, Munich, Germany

[21] Appl. No.: 09/401,023

[22] Filed: Sep. 21, 1999

Related U.S. Application Data

[63] Continuation of application No. PCT/DE98/00840, Mar. 23, 1998.

[30] Foreign Application Priority Data

Mar. 21, 1997 [DE] Germany .......................... 197 11 958

[51] Int. Cl.$^7$ .............................. H04L 12/56; H04B 3/54
[52] U.S. Cl. ......................... 370/256; 370/401; 370/408
[58] Field of Search .................................. 370/254, 255, 370/256, 400, 401, 408

[56] References Cited

U.S. PATENT DOCUMENTS

| | | | |
|---|---|---|---|
| 4,987,536 | 1/1991 | Humblet | 370/256 |
| 5,029,334 | 7/1991 | Braun . | |
| 5,289,460 | 2/1994 | Drake, Jr. et al. | 370/256 |
| 5,386,466 | 1/1995 | Bales et al. | 370/256 |
| 5,428,636 | 6/1995 | Meier | 370/256 |
| 5,606,669 | 2/1997 | Bertin et al. | 370/256 |
| 5,784,557 | 7/1998 | Oprescu | 370/256 |

FOREIGN PATENT DOCUMENTS

| | | |
|---|---|---|
| 0 395 495 A1 | 10/1990 | European Pat. Off. . |
| 0 598 297 A2 | 5/1994 | European Pat. Off. . |
| 0 852 419 A2 | 7/1998 | European Pat. Off. . |
| 2674996 | 10/1992 | France . |
| 360190906A1 | 1/1987 | Germany . |
| 677300A5 | 4/1991 | Switzerland . |

OTHER PUBLICATIONS

Published International Application No. WO 95/01030 (Farnsworth et al.), dated Jan. 5, 1995.

*Primary Examiner*—Ricky Ngo
*Attorney, Agent, or Firm*—Herbert L. Lerner; Laurence A. Greenberg; Werner H. Stemer

[57] ABSTRACT

A method for communication in a network, in particular for communication in an electrical low voltage network, transmits a status check from a master to a plurality of slaves in several network paths. A slave that cannot be directly accessed by the master, such as an additionally installed salve, is included in the network with the help of a neighboring slave. The neighboring slave is used as a router slave for the slave that cannot be directly accessed. For this purpose, a network management software for the master is provided with a software module for assigning at least one router slave to each slave. Each slave is assigned a corresponding software module to identify a neighboring slave as a potential router slave. A network for communication is also provided.

11 Claims, 4 Drawing Sheets

Fig.3

DATA TABLE

| DEVICE ADDRESS | NETWORK LAYER ADDRESS |
|---|---|
| METER #1 | 0001h |
| METER #2 | 0002h |
| METER #3 | 0003h |
| ... | ... |
| METER #32751 | 7FEFh |

| NW ADDR. | ROUTE #1 | | | ROUTE #2 | | | ROUTE #3 | | |
|---|---|---|---|---|---|---|---|---|---|
| | R 1 | R 2 | QUALITY | R 1 | R 2 | QUALITY | R 1 | R 2 | QUALITY |
| 0001h | 7FFFh | 7FFFh | 27 | 0002h | 0005h | 17 | 010Ah | 7FFFh | 12 |
| 0002h | 7FFFh | 7FFFh | 25 | 0005h | 5305h | 15 | 010Ch | 7FFFh | 7 |
| 0003h | 0AD7h | 7FFFh | 15 | 0232h | 7FFFh | 12 | 012Dh | 217Fh | 5 |
| ... | | | | | | | | | |
| 7FEFh | 7FFFh | 7FFFh | 29 | 0002h | 0E05h | 18 | 01BAh | 7FFFh | 12 |

DATA TABLE

| ADDR. #1 | ADDR. #2 | ADDR. #3 | ADDR. #4 | ADDR. #5 |
|---|---|---|---|---|
| 15 MIN #1 | 15 MIN #2 | 15 MIN #3 | 15 MIN #4 | 15 MIN #5 |

DT<sub>S</sub>

| DEVICE ADDRESS | R | 1 | R | 2 | R | 3 |
|---|---|---|---|---|---|---|
| METER #1 | | 0005h | | 5305h | | 7FFFh |
| METER #2 | | 0232h | | 7FFFh | | 7FFFh |
| | | | | | | |
| METER #7FEF | | 0002h | | 0E05h | | 7FFFh |

NETWORK COMMUNICATION

CROSS-REFERENCE TO RELATED APPLICATION

This is a continuation of copending International Application PCT/DE98/00840, filed Mar. 23, 1998, which designated the United States.

BACKGROUND OF THE INVENTION

Field of the Invention

The invention relates to a method for network communication, in particular for communication within an electrical low-voltage network. The invention also relates to a network which can be used for communication.

In a network which can be used for communication and in which the communication takes place via heavily attenuated media with interference that varies with time, adaptive and self-learning communication software is normally used, which is based on the mechanisms of collision identification and/or collision avoidance. Such mechanisms are, however, unsuitable for so-called PLC communication (PLC=Power Line Carrier) in a power supply network, since two terminal devices can transmit on different cables without being able to "listen" to one another. The use of a master-slave architecture is thus preferred for PLC communication or transmission in power supply networks, wherein a status check or status inquiry (status polling) is transmitted from the master to a number of slaves in a number of network paths.

A network which can be used for communication and has such a master-slave architecture is disclosed, for example, in the Published European Patent Application EP 0 598 297 A2. In this case, the master uses the network to send a logon request to all the newly installed devices (slaves) in the network, so that, after receiving a response from the newly installed slaves, the master can communicate with these slaves. Such a network, which can be used for communication, makes it possible, in particular, to read electricity meters and to automatically identify an additional meter or device connected to the network, without any additional installation cost. However, it is disadvantageous that only slaves (devices) which can be accessed directly by the master can be identified and can be included in the network.

Swiss Patent CH 677 300 A5 discloses a method for transmitting data packets in a network, in which subscriber stations which cannot be accessed directly by the master are contacted via subscriber stations which act as a relay station. In order to include new subscribers in the network, a special request is sent, which, if necessary, is sent via the relay stations to the new subscribers. The new subscribers then respond to the request from the master. Published German Patent Application DE 36 19 906 A1 and Published European Patent Application EP 0 395 495 disclose other networks, in which subscribers can be accessed indirectly.

International Publication Number WO 95/01030 also discloses a method of checking indirectly accessible slaves by a master via neighboring router slaves within a network, wherein the corresponding network route is defined by the master, and this master assigns a corresponding network address to the corresponding slaves.

SUMMARY OF THE INVENTION

It is accordingly an object of the invention to provide a method for communication within a network having a master/slave architecture and to provide a network having a master/slave architecture which can be used for communication, which overcome the above-mentioned disadvantages of the heretofore-known methods and networks of this general type and which, on the one hand, allow a communication with the master from a device which cannot receive the master directly, and which, on the other hand, allow newly installed devices to be included in the network in a simple manner, irrespective of their distance from the master and without stimulation or initiation by the master.

With the foregoing and other objects in view there is provided, in accordance with the invention, a method for communication within a network, in particular within an electrical low-voltage network, which comprises:
transmitting a status check from a master to a plurality of slaves in a plurality of network routes of a network, the plurality of slaves including an indirectly accessible slave having neighboring slaves;
storing addresses of the neighboring slaves with the indirectly accessible slave;
registering, with the indirectly accessible slave, the indirectly accessible slave at at least one of the neighboring slaves, the at least one of the neighboring slaves serving as a router slave;
registering the indirectly accessible slave at the master via the router slave;
installing the indirectly accessible slave in the network by assigning, with the master, an address of the router slave to the indirectly accessible slave; and
addressing, with the master, the router slave for checking the indirectly acessible slave.

In accordance with another mode of the invention, a further status check of the master is passed on to the indirectly accessible slave via the router slave.

In accordance with yet another mode of the invention, each of the plurality of slaves is assigned at least one router slave; each of the plurality of slaves is cyclically checked for the at least one router slave; and an address of each of the plurality of slaves is assigned to a respective address of the at least one router slave.

In accordance with a further mode of the invention, a further router slave is provided for the indirectly accessible slave; and respective priorities are assigned to the router slave and the further router slave based on an accessibility of the indirectly accessible slave; and, based on the respective priorities, the indirectly accessible slave is installed in this network via one of the router slave and the further router slave.

In accordance with yet a further mode of the invention, an address is assigned to the indirectly accessible slave with the master.

In accordance with another mode of the invention, subsequent to the storing step a registration signal is spontaneously transmitted into the network with the indirectly accessible slave.

With the objects of the invention in view there is also provided, a network for communication, comprising:
a master;
network routes connected to the master;
a plurality of slaves provided in the network routes, the plurality of slaves including an indirectly accessible slave and router slaves, each of the router slaves having an address;
a network management software module including a first module assigned to the master and a second module assigned to each of the plurality of slaves;

the indirectly accessible slave executing the second software module for identifying at least one of the router slaves based on the address thereof, the indirectly accessible slave generating a spontaneous registration signal to be received by any of the master and the slaves; and the master checking a status of the plurality of slaves, storing the addresses of the router slaves, and executing the first software module for assigning the address of the at least one router slave, identified by the indirectly accessible slave, to the indirectly accessible slave.

In accordance with another feature of the invention, the master executes the first software module for assigning at least two of the router slaves to the indirectly accessible slave for establishing a first route and a second route as an alternative route to the first route.

In accordance with yet another feature of the invention, the master executes the first software module for assigning an address to the indirectly accessible slave.

In accordance with a further feature of the invention, the plurality of slaves includes neighboring slaves of the indirectly accessible slave, and the indirectly accessible slave executes the second software module for generating a priority list of addresses of the neighboring slaves based on a proximity to the indirectly accessible slave and for passing on a list produced by one of the neighboring slaves to the master.

With regard to the method, the object of the invention is achieved by identifying each slave, which cannot be accessed directly but only indirectly by the master, is identified and is included in the network via a neighboring slave. The new slave in this case registers in the network, once the new slave has acquaint ed itself with its network environment, particularly with regard to the neighboring or adjacent slaves, by monitoring or "listening-in". This may be called a general registration call or answering call, which is intended to be heard by as many subscribers as possible. The registration call may also include information about the "best neighbors", to which priorities are assigned.

The new slave thus identifies itself or allows itself to be identified in the network and, if necessary, at the same time reports the network environment which has been identified by the new slave, so that the new slave can be addressed by the rest of the network. The master can then use a neighboring slave, which has been prioritized as a router slave, to check a slave, which can be accessed only indirectly, and can receive its response.

The method for communication within a network according to the invention, in particular for communication within an electrical low-voltage network, includes a status check which is transmitted from a master to a large number of slaves in a number of network routes. A slave which can be accessed indirectly from the master is included in the network via a neighboring slave which is identified as a router slave. During a status check by the master, network addresses of a number of adjacent slaves are at first stored by a slave which is additionally to be included in the network. The slave which is additionally to be included into the network registers with at least one of the neighboring slaves and is registered with the master via this slave which is then used as a router slave. Using the master, the network address of the router slave or each router slave is assigned to the slave which is additionally to be included. The router slave is addressed by the master in order to check the slave which can be accessed indirectly, whereupon the slave which is to be included into the network is regarded as having been installed in the network.

This method is particularly suitable for including new devices and thus additional slaves in the network. In this case, a number of neighboring slaves are prioritized as router slaves (best neighbors) by the newly installed slave during or following a status check from the master which is received by the newly installed slave. This information is then also reported with the registration call of the additional or new slave. The new slave is then logged on with the master by one or by each prioritized router slave, with an address assigned to the newly installed slave being included in an appropriate register or in a data table. This data table also includes those router slaves and those network paths or network routes via which the additionally installed slave can be accessed in accordance with a respectively assigned reliability priority.

Following each status check by the master, the grouping of the addresses in the data table of the slaves which are connected to the network is updated with regard to the network routes and those router slaves via which the respective slave can be accessed. In this case, each slave is assigned at least one router slave, in which case the address of the master can also be included as a router address in this routing table. In this case, the corresponding slave can be accessed directly by the master.

With regard to the network which can be used for communication and has a master and a large number of slaves in a number of network routes or network paths which are connected to the master, the object of the invention is achieved by a network management software that operates in accordance with the method of the invention. The network management software is furthermore advantageously also used to generate network routes, in particular substitute routes, between the master and each slave.

A network which can be used for communication in accordance with the invention, has a master and a large number of slaves in a number of network routes which are connected to the master. The master is configured to check the status of each slave. A network management software is configured to assign router slaves to a slave or alternatively to each slave and to set up connections between neighboring slaves. Addresses of neighboring slaves are stored in the master. The master runs a software module of the network management software which is assigned to the master, so that the assignment of at least one router slave with its address to the slave or alternatively to each slave is carried out. The slave or alternatively each slave runs a software module of the network management software which is assigned to it, so that the identification of a neighboring slave is carried out with its address. The slaves are configured to produce a spontaneous registration signal, which can be received by the master and/or by at least one slave.

The architecture of the network management software is based on the ISO communication protocol (ISO= International Standardization Organization) wherein the three lowest layers of this communication protocol or model are implemented in order to ensure router functionality within the network management software.

The ISO communication protocol, which is broken down into seven hierarchical layers or protocol levels, is a quasi-standardized model for the development of interfaces for the communication process within a communication network. In this case, the lowest, first layer (physical layer) defines the way in which signals or individual bits (from which, for example modulation or amplification data are formed) are transmitted. The second layer (data link layer) defines the methods for ensuring error-free transmission on the individual network routes or network paths of the systems (slaves) in order to avoid collisions. The third layer (network layer) ensures that the individual path sections between the master (transmitter) and slave (receiver) are set up correctly. The fourth layer (transport layer) defines the function and the way in which the systems (master, slaves) within the network are intended to behave during data transport. The lower four layers represent the transport protocol and are nowadays to a large degree defined in systems in accordance with the ISO communication protocol.

The fifth layer (connection layer) defines the communication details to be used when a connection is to be made between the systems, that is to say between the master and the slaves and between the slaves. The sixth layer (presentation layer) defines the agreements to be reached on the importance of the data interchanged. Agreements on the permissible applications between the communicating systems are fixed in the top, seventh layer (application layer). These three upper layers are also called the application protocol, in which agreements are reached on those possible and permissible operations which the master initiates in the system of the slave. Thus, in order to implement the router function, advantageously only a data conversion within the three lowest layers of the ISO communication protocol is required.

In a preferred embodiment, the network management software includes a (first) software module assigned to the master as well as a (second) software module assigned to each slave. In this case, the software module in the master is used to generate at least one router slave for a slave or for each slave. This software module preferably generates at least one additional network path or substitute route via which this slave can be alternatively accessed. The software module in the slave is used to identify a neighboring slave. In this case, this software module generates a priority or quality list of the "best neighbors" in terms of a reception quality. This list is passed on to the master via the software modules of those neighbors.

The advantages achieved by the invention are, in particular, that the master-slave architecture, which is known per se, is violated or altered in a suitable manner such that a slave which can be accessed only indirectly by the master is included in the network via a neighboring slave (router). Even new devices (slaves) which cannot be received directly by the master can be included automatically in a network which can be used for communication, in a simple manner and without any additional installation effort. In this case, the new slave actively registers on the network through the use of a registration signal, without being requested to do so. This is done only after the slave has informed itself of the active network environment.

The method is particularly suitable for a communication within an electrical low-voltage network, in which status checks are transmitted cyclically to a large number of electricity meters (slaves) in a number of network routes from a data concentrator (master) in order to gather and store meter data from these slaves. In this case, the data concentrator includes devices, which can be accessed only indirectly, in the network via the "best neighbors" (router).

Other features which are considered as characteristic for the invention are set forth in the appended claims.

Although the invention is illustrated and described herein as embodied in a method for network communication and a corresponding network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3 and 4 are data tables of a master and a slave, respectively, describing the router functionality.

DESCRIPTION OF THE PREFERRED EMBODIMENTS

Figure 1:
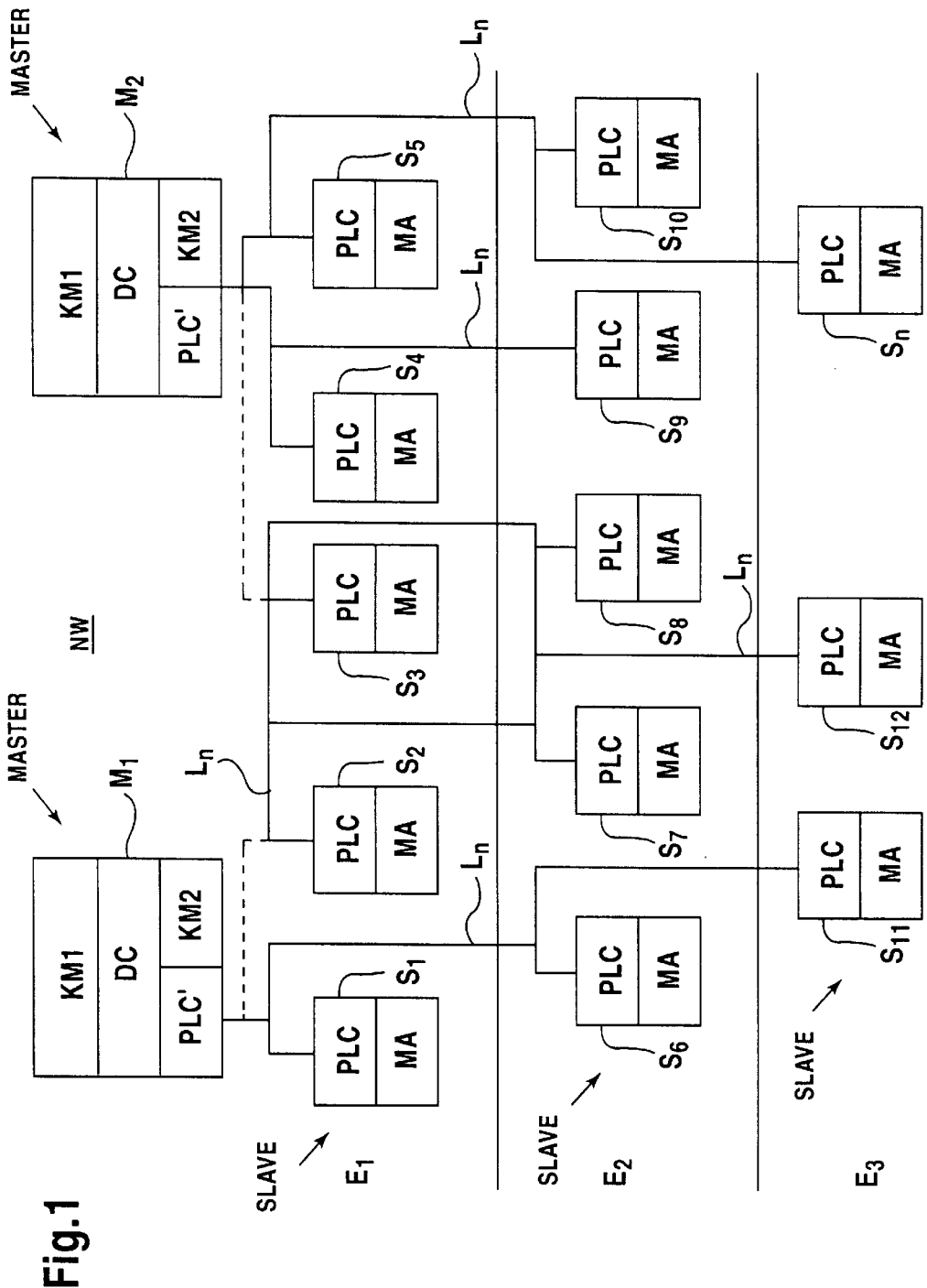
FIG. 1 is a schematic block diagram of a master-slave architecture within a meshed network which can be used for communication.

Referring now to the figures of the drawings in detail and first, particularly, to FIG. 1 thereof, there is shown a system architecture of a PLC subsystem (Power Line Carrier Subsystem) of a network NW which can be used for communication and, in the exemplary embodiment, has two masters $M_1$, $M_2$ and a number of slaves $S_1 \ldots S_n$, which are connected to these masters $M_1$, $M_2$ via the meshed network NW such that they can communicate. The slaves are provided in three different range groups $E_1$, $E_2$, $E_3$ relative to the locations of the masters $M_1$, $M_2$. The exemplary embodiment relates to a master-slave architecture within a power supply network. In this case, the masters $M_1$, $M_2$, which operate on different channels, are each assigned to a transformer station (which is not shown in any more detail), while the slaves $S_1 \ldots S_n$ are conventional electricity meters—also referred to as devices in the following text—installed in domestic premises.

Each master $M_1$, $M_2$ represents a data concentrator (Distribution Data Unit) for the devices or slaves $S_1 \ldots S_n$ associated with it. Network management software, which will be explained in more detail with reference to FIG. 2, sets up connections from the respective master $M_1$, $M_2$ to the respective slaves $S_1 \ldots S_n$.

Due to the meshed network topology, the masters $M_1$, $M_2$ have to communicate on different channels in order to avoid mutual superimposition during data transmission. Setting up the connection from each slave $S_1 \ldots S_n$ to its master $M_1$ or $M_2$ may be achieved either directly or by using a number of slaves $S_1 \ldots S_n$ as so-called "routers". In this case, the meshing allows a slave $S_n$ to be connected to different masters $M_1$, $M_2$, and it is possible for a slave $S_n$ to change from one master $M_1$, $M_2$ to the other master $M_2$, $M_1$ during operation.

During the normal type of communication which takes place in the master-slave mode, data collisions resulting from data being transmitted from different network points at the same time are avoided. The router functionality of the or each slave $S_n$ described in more detail in the following text furthermore ensures that a response sent from a slave $S_n$ as a consequence of a status check from the appropriate master $M_1$, $M_2$ is received by the other slaves $S_1 \ldots S_{n-1}$. This violation of the normal master-slave mechanism avoids any additional installation efforts and realizes as additional functions an automatic inclusion and automatic network assignment (routing), due to a so-called "logon request", even of those slaves $S_1 \ldots S_n$ which do not have a direct access to one of the masters $M_1$, $M_2$. This is of particular importance especially for the installation of new, additional devices in the network since, after their installation, they have no logic connection yet to one of the masters $M_1$, $M_2$ and thus at this time, can neither be identified by these masters $M_1$, $M_2$, nor can they be received by them. In the exemplary embodiment, this applies to the slaves $S_6 \ldots S_{10}$ and $S_{11} \ldots S_n$, respectively, which are disposed in the range groups $E_2$ and $E_3$ or have been newly installed there.

To achieve this additional router functionality, each slave $S_n$ has a software module PLC, and each master $M_1$, $M_2$ has a software module PLC'. The software module PLC of each slave $S_n$ is connected to a connecting line $L_n$, which is connected to the respective device, for power transmission including the overall network functionality. In this case, in order to achieve the router functionality, the lowest three layers of the ISO communication protocol are implemented in this software module PLC in each slave $S_n$. The higher layers in the ISO communication protocol are implemented in an application module MA (Meter Applications) in the appropriate slave $S_n$. In this case, the functionality of this application module MA is independent of the functionality of the software module PLC, so that each network management function runs via these software modules PLC.

Each master $M_1$, $M_2$ has a data concentrator DC and a first communication module KM1, which operates only at the master level, as well as a second communication module KM2 for communication that is functionally independent of the software module PLC'. In this case, the software module PLC' is additionally integrated into the master functionality.

Figure 2:
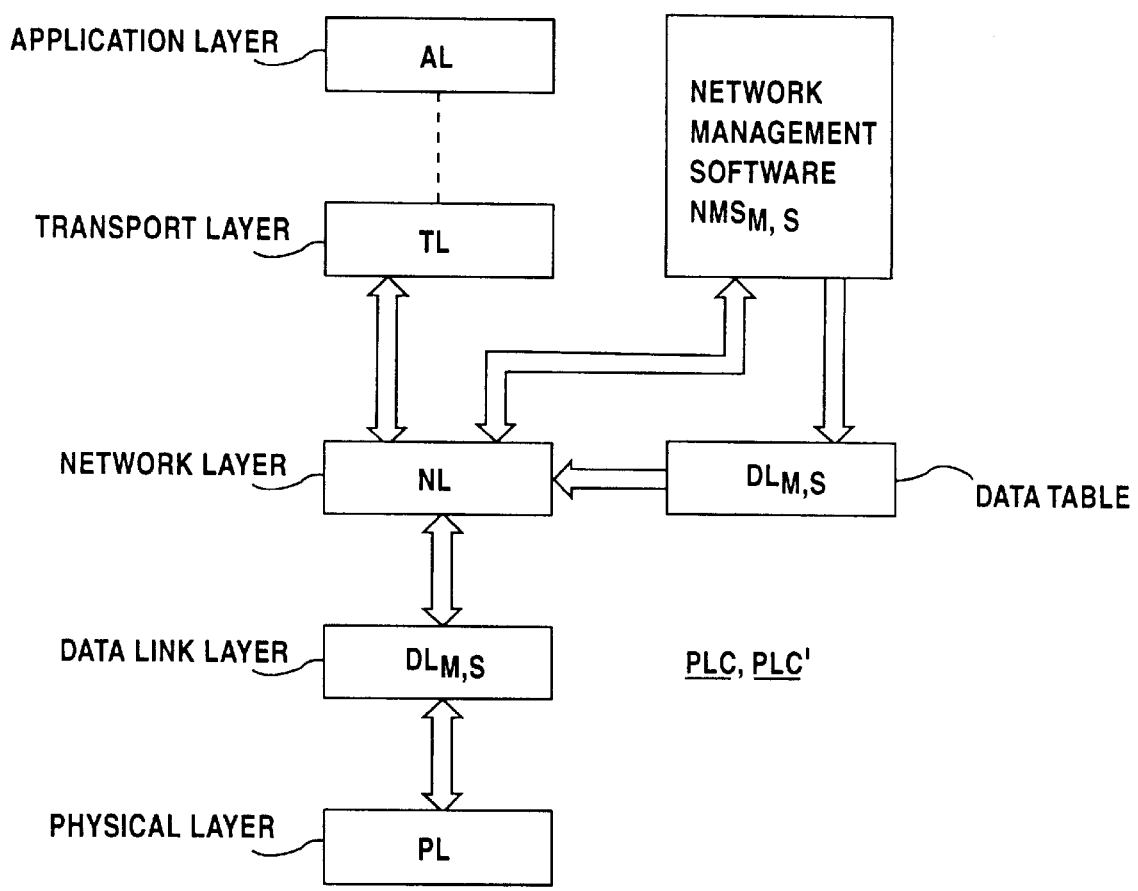
FIG. 2 is a schematic block diagram of a software architecture of a network management system for generating a router functionality within the meshed network according to FIG. 1.

The architecture of network management software which is implemented in the software module PLC of the or each slave $S_n$ and in the software module PLC' of the or each master $M_1$, $M_2$ is shown schematically in FIG. 2. The illustration shows the implementation of the network management software NMS and of a tabular network database or data table DT within the layers of the ISO communication protocol. In this case, via the third layer or network layer NL, the network management software NMS on the one hand implements the switching for data transport either to the next higher layers as far as the application layer AL, or to the next lower layer, which represents the data transport or data link layer DL in the ISO communication protocol. The data table DT also accesses the network layer NL and is, in turn, accessed by the network management software NMS. In this case, the network layer NL is transparent to the layers above it.

The network layer NL requires network information data in order to be able to transmit inquiries or information to the respective slaves $S_1 \ldots S_n$ which are addressed as router slaves. The functions of the network layer NL are thus always the same for the master $M_1$, $M_2$ and for each slave $S_n$, while the network data and thus the data tables DT as well as the network management software NMS of the master $M_1$, $M_2$ and of the slave $S_n$ are different. The data link layer DL located between the network layer NL and the physical layer PL is also transparent for the network management software NMS. Within this data link layer DL, in which the functionality of collision identification and/or collision avoidance can also be implemented, point-to-point links between the slaves $S_1 \ldots S_n$ are set up, or "broadcasts" are sent, without any master-slave structure.

The software architecture shown in FIG. 2 applies both to the software module PLC' in the master $M_1$, $M_2$ and to the software module PLC in the slave $S_n$. In this case, only the functionalities of the network management software NMS and the contents and form of the data table DT for the master $M_1$, $M_2$ and for the slave $S_n$ differ, while the respective structure is identical. Thus, in the following text, indices are used in an appropriate manner to refer to the network management structure $NMS_M$ of the master $M_1$, $M_2$, and to the network Management software $NMS_S$ of the slave $S_n$. With regard to the software module PLC' of the master $M_1$, $M_2$, the network layer NL is used for receiving data from the higher layers (transport layer TL, application layer AL) or from the network management software $NMS_M$, and for transmitting such data to the data transport layer DL.

The data table $DT_M$ produced by the software module PLC' of the master $M_1$, $M_2$ is shown in FIG. 3. The frame of the corresponding data link level $DL_M$ includes an address (Device Address) of the respective slave $S_n$ (Meter), which is changed using the upper list (Logon List) in FIG. 3 to a network address (Network Layer Address). Furthermore, the frame of the data link layer $DL_M$ contains a number of fields for, for example, a first and a second router slave. These fields are filled, using the lower list (Routing List) in FIG. 3, with a route to the respective router slave R1, R2, in which case the best router slave in terms of the capability to access a neighboring slave $S_n$ is prioritized on the basis of a quality code. The stated addresses, which run continuously from 0001h to 7PEFh are chosen by way of example, with the address 7FFFh denoting an unused router slave $R_1$, $R_2$.

The master $M_1$, $M_2$ groups the slaves $S_n$ which are connected to it and are listed in the "Logon List" on the basis of their router slaves R1, R2 and, in the process, builds this list as a network data table $DT_M$, which is updated cyclically. In this way, each slave $S_n$ is assigned respective two router slaves R1 and R2 in three network paths or network routes $L_n$ (route Nos. 1, 2 and 3) through the use of the software module PLC' in the master $M_1$, $M_2$.

In an analogous manner, each slave $S_n$ uses the software module PLC to produce a network data table $DT_S$ as shown in FIG. 4. on the one hand, the addresses of those router slaves R1, R2, R3 via which this slave $S_n$ can be accessed are entered in the lower list (Logon Request List) of the data table $DT_S$ in FIG. 4.

For this purpose, the slave $S_n$ first of all collects, in the upper list (Best Router List) in FIG. 4, the addresses (address Nos. 1, 2, 3) of the slaves $S_n$ received by it via possible communication paths (routes) and which have not already been addressed by two router slaves R1, R2. In this case, these addresses are stored over a time frame $T_Z$ (which can be predetermined) of, for example, 15 minutes before the slave $S_n$ reports to the master M1, M2, in the course of a cyclic status check, the three first addresses of the "best neighbors" via the router slaves R1, R2 associated with these addresses. In this case, the time frames $T_z$, that is to say the waiting times, are subject to an aging process, such that more recent results are taken into account more than older results.

An additionally installed device, in particular a slave which is to be included for the first time, via its software module PLC and during a status check by the associated master $M_1$, $M_2$ during which the slave itself has not yet been checked since it is "unknown" in the network, can thus initially collect addresses from slaves $S_n$ which are identified as possible router slaves R1 to R5, and can prioritize them in terms of their respective accessibility. In other words the slave, which is to be included in the network, informs itself of its network environment.

This slave $S_n$ then uses a spontaneous registration signal to register in the network and, immediately or if necessary on the basis of a subsequent call, reports the addresses of the prioritized router slaves R1 to R3. In accordance with the prioritized slaves, the new slave is then logged on with the appropriate master $M_1$, $M_2$, by the router slave or slaves R1 to R3. Its software module PLC' then, in turn, initiates an appropriate entry in its network data table $DT_M$. The master $M_1$, $M_2$ then causes the router slave R1 with the highest priority to include the additionally installed slave $S_n$ in the network NW, via the appropriate route (route No. 1).

The other registered router slaves R1, R2 for the other routes (route No. 2 and 3) are then recorded as substitute routes, in accordance with their priority (quality). The software module PLC of each slave $S_n$ is thus used to identify both a neighboring slave $S_n$, for example a newly installed slave $S_n$, and at least one neighboring slave $S_n$ as a future router slave R1, R2.

In the exemplary embodiment, the network management software NMS—implemented in the software modules PLC, PLC'—thus allows each master $M_1$, $M_2$ to assign three communication paths (routes) to each slave $S_n$. The corresponding data table $DT_M$ which, in addition to these routes or network paths $L_n$, also includes the router slaves R1, R2 assigned to each slave $S_n$, is preferably updated dynamically. Furthermore, the network management software NMS allows each newly installed slave $S_n$ to receive its neighboring slaves $S_1 \ldots S_{n-1}$, and to register for inclusion in the network NW via the "best neighbors"—that is to say the newly installed slave register virtually on its own.

In this way, newly installed devices (slaves) can be included in the network NW, irrespective of their distance from the data concentrator DC (master) in a simple manner and without any additional installation effort. In this case, for example, two router slaves R1, R2 are listed in the data table DT for each slave $S_n$ in the third range group $E_3$, while only one router slave R1 is listed for each slave $S_n$ in the second range group E2. In the case of slaves $S_n$ in the first range group $E_1$ which are received directly by the master $M_1$, $M_2$, the master $M_1$, $M_2$ is itself registered as a router slave R1.

In other words, the major aspect of the new idea is that, after an orientation or monitoring phase in the network, new slaves register on their own with router slaves in the network without being requested to do so by using a "piggyback" method, so that they can then be indirectly included in the data network. They are subsequently included indirectly—as a second or third generation so to speak—in the data traffic with the master, in which case this master has no direct access to such slaves. A change can be effected if the transmission qualities or the network configuration changes. This is checked by routine status checks, and is updated if necessary.

I claim:

1. A method for communication within a network, which comprises:
   transmitting a status check from a master to a plurality of slaves in a plurality of network routes of a network, the plurality of slaves including an indirectly accessible slave having neighboring slaves;
   storing addresses of the neighboring slaves with the indirectly accessible slave;
   registering, with the indirectly accessible slave, the indirectly accessible slave at at least one of the neighboring slaves, the at least one of the neighboring slaves serving as a router slave;
   registering the indirectly accessible slave at the master via the router slave;
   installing the indirectly accessible slave in the network by assigning, with the master, an address of the router slave to the indirectly accessible slave; and
   addressing, with the master, the router slave for checking the indirectly accessible slave.

2. The method according to claim 1, which comprises passing or a further status check of the master to the indirectly accessible slave via the router slave.

3. The method according to claim 1, which comprises:
   assigning each of the plurality of slaves at least one router slave;
   cyclically checking each of the plurality of slaves for the at least one router slave; and
   assigning an address of each of the plurality of slaves to a respective address of the at least one router slave.

4. The method according to claim 1, which comprises:
   providing a further router slave for the indirectly acessible slave;
   assigning respective priorities to the router slave and the further router slave based on an accessibility of the indirectly accessible slave; and
   installing, based on the respective priorities, the indirectly accessible slave in the network via one of the router slave and the further router slave.

5. The method according to claim 4, which comprises assigning, with the master, an address to the indirectly accessible slave.

6. The method according to claim 1, which comprises spontaneously transmitting a registration signal into the network with the indirectly accessible slave, subsequent to the storing step.

7. The method according to claim 1, which comprises providing the master and the plurality of slaves in an electrical low-voltage network.

8. A network for communication, comprising:
   a master;
   network routes connected to said master;
   a plurality of slaves provided in said network routes, said plurality of slaves including an indirectly accessible slave and router slaves, each of said router slaves having an address;
   a network management software module including a first module assigned to said master and a second module assigned to each of said plurality of slaves;
   said indirectly accessible slave executing said second software module for identifying at least one of said router slaves based on said address thereof, said indirectly accessible slave generating a spontaneous registration signal to be received by any of said master and said slaves; and
   said master checking a status of said plurality of slaves, storing said addresses of said router slaves, and executing said first software module for assigning said address of said at least one router slave, identified by said indirectly accessible slave, to said indirectly accessible slave.

9. The network according to claim 8, wherein said master executes said first software module for assigning at least two of said router slaves to said indirectly accessible slave for establishing a first route and a second route as an alternative route to said first route.

10. The network according to claim 8, wherein said master executes said first software module for assigning an address to said indirectly accessible slave.

11. The network according to claim 8, wherein said plurality of slaves includes neighboring slaves of said indirectly accessible slave, and said indirectly accessible slave executes said second software module for generating a priority list of addresses of said neighboring slaves based on a proximity to said indirectly accessible slave and for passing on a list produced by one of said neighboring slaves to said master.

* * * * *